United States Patent [19]
Ellis et al.

[11] 3,830,690
[45] Aug. 20, 1974

[54] GROUNDWOOD PULP BLEACHING WITH SODIUM HYDROSULFITE IN THE PRESENCE OF SODIUM SALTS OF GLUCONO-CITRATE COMPLEXES OF POLYAMINOVERSENIC ACID

[75] Inventors: Leonard C. Ellis, Chesapeake; Mearl A. Kise, Portsmouth, both of Va.

[73] Assignee: Virginia Chemicals Inc., Portsmouth, Va.

[22] Filed: Aug. 3, 1972

[21] Appl. No.: 277,555

[52] U.S. Cl.......................... 162/71, 162/76, 162/83
[51] Int. Cl............................................... D21c 9/10
[58] Field of Search ................... 162/71, 76, 72, 83; 252/DIG. 11; 260/534 E

[56] References Cited
UNITED STATES PATENTS

| | | | |
|---|---|---|---|
| 2,663,704 | 12/1953 | Yehling | 252/DIG. 11 |
| 2,707,145 | 4/1955 | Sparrow et al. | 162/71 |
| 2,741,599 | 4/1956 | McDonald et al. | 252/DIG. 11 |
| 3,116,105 | 12/1963 | Kerst | 252/DIG. 11 |
| 3,467,574 | 9/1969 | West | 162/71 X |
| 3,607,931 | 9/1971 | Hegarty et al. | 260/534 E |
| 3,709,779 | 1/1973 | Gupta | 162/71 |

OTHER PUBLICATIONS

Gupta et al., Pulp & Paper Magazine of Canada, June 6, 1969, pgs. 77–84.

Deselex, Guardian Chemical Corporation, Dec. 11, 1970.

*Primary Examiner*—S. Leon Bashore
*Assistant Examiner*—Arthur L. Corbin
*Attorney, Agent, or Firm*—J. Gibson Semmes

[57] ABSTRACT

The bleachability of sodium hydrosulfite on groundwood pump is significantly improved when the bleaching is conducted in the presence of either sodium salts of gluconocitrate complexes of polyaminoversenic acid or disilicate complexes of sodium salts of glucono-citrate complexes of polyaminoversenic acid, such bleaching process significantly reducing the eutrophication of waters into which waste effluents may flow.

4 Claims, No Drawings

27
GROUNDWOOD PULP BLEACHING WITH SODIUM HYDROSULFITE IN THE PRESENCE OF SODIUM SALTS OF GLUCONO-CITRATE COMPLEXES OF POLYAMINOVERSENIC ACID

BACKGROUND OF THE INVENTION

1. Field of the Invention

The widespread use of phosphates in bleaching processes of pulp for the paper industry gives rise to problems of economic and environmental impact. To preserve the bleaching agent hydrosulfite against decomposition during bleaching, while at the same time avoiding the creation of a polluting waste effluent, is a problem faced by the paper industry today.

As is known, eutrophication is a process characterized by an abundant accumulation of nutrients, such as carbon, nitrogen and phosphorus, in lakes and rivers that support a dense growth of algae and floating algae scums. The algae growths are odorous, clog filter treatment plants, and decay during the summer through an aerobic process which depletes the shallow waters of oxygen. Natural runoff, agricultural drainage, groundwater, sewage and waste effluents carry these objectionable nutrients into the rivers and streams. It has been speculated that phosphorus and nitrogen-containing components, especially in detergents and bleaching agents, are major contributors to the eutrophication process. In groundwood pulp bleaching, one of the most effective agents in use today is sodium hydrosulfite. In actual industrial practice, the sodium hydrosulfite concentration may range between 0.2 percent to 15.0 percent with 1 percent to 5 percent solutions being most commonly employed. Sodium hydrosulfite, however, is difficult to stabilize against decomposition and for stabilization has required substantial phosphate addition with its attendant undesirable waste effluent palliation.

The addition of sequestering agents is required since traces of heavy metals, for example ferric ions, are found in the groundwood bleach system. These heavy metals are suspected of causing two major problems which seriously affect the brightness gain in the given pulp bleaching operation. First, the groundwood pulp acts as a low capacity cationic exchanger with a great affinity for heavy metals, such as iron, which in turn produces colored compounds in the pulp. Second, these heavy metal ions in the bleaching system, it is suspected, catalyze the decomposition of the hydrosulfite. The overall effect leads to increased consumption of sodium hydrosulfite to obtain a given pulp brightness. In addition, the paper manufactured in the presence of heavy metal ions, shows a large loss in brightness during storage. Sequestering agents, such as sodium tripolyphosphate, trisodium nitrilotriacetate (NTA) and trisodium ethylenediaminetetraacetate (EDTA) have been widely employed to tie-up these metal ions. The addition of these known sequestering agents results in a paper brightness during storage and shipment. The great popularity of phosphates and nitrogen-containing compounds, in addition to economic factors, can probably be attributed to their multi-functional properties, such as chelation ability, alkalinity, buffer capacity and soil deflocculation. Today, these additives have come into disfavor for various reasons.

The phosphates have been accused of playing the major role in the eutrophication process above-described and their use in such saleable goods as detergents have been limited or banned in certain areas of the country by Government order.

The sequestering agent NTA has been banned because it is suspected of carrying heavy metals across the placenta into the fetus of pregnant women.

It is therefore an object of the present inventiOn to develop groundwood pulp bleaching formulations which are essentially free of phosphorus and toxicological problems, and which are compatible with the sodium hydrosulfite bleaching agent.

2. Description of the Prior Art:
References:
A. V. Lamberti, Can. Patent 853,647 (1970).
B. V. N. Gupta and D. B. Mutton, Pulp and Paper Magazine of Canada, T174, pp. 77–84, June 6, 1969.

SUMMARY OF THE INVENTION

Groundwood pulp can be bleached to a substantially greater degree by the addition to a pulp water slurry having a consistency which is less than 5.0 percent; of sodium salts of glucono-citrate complex of a polyaminoversenic acid to the sodium hydrosulfite bleaching agent. In general, the bleach water solution must contain 3.0 to 50.0 lbs. hydrosulfite and 0.5 to 10.0 lbs. of the sodium salts, respectively per ton of pulp. Similarly, the sodium hydrosulfite bleaching of groundwood pulp in the presence of disilicate complexes of sodium salts of glucono-citrate complexes of a polyaminoversenic acid is described.

DESCRIPTION OF THE PREFERRED EMBODIMENTS

Sodium salts of the glucono-citrate complex of polyaminoversenic acids, and disilicate complexes thereof have been found to be adequate sequestering agents for groundwood pulp bleaching with sodium hydrosulfite. Bleaching temperatures may vary at from 90°F. to 170°F. but the preferred range is 125°F. to 140°F. While pH in various and related bleaching systems is at pH 4.1 to 6.3, the preferred rational pH range is pH 5.0 to 5.6.

EXPERIMENTAL TESTING

Tests were conducted to determine the efficiency of these salts and disilicate complexes thereof in sequestering the iron and other objectionable metals found in the bleaching process. The tests (Reference Tables I and II) consisted of preparing twelve grams of dry pulp and mixing into water so that the pulp constituted 3.25 percent of the heterogeneous mixture. This mixture was blended for approximately 10 to 15 seconds and the blended pulp was thereafter filtered through 100 mesh screen. The filter pad was then divided into equal portions and placed one each into 500 milliliter Erlenmeyer flasks. The filtrate was treated with ferric ion to simulate the objectionable metals found in the bleaching process and divided equally into each flask. Make up water was then added to provide a total weight of 370 grams each.

The flasks were then de-aerated and placed under an inert atmosphere. While maintaining the inert atmospheric condition a commercially available sodium salt of glucono-citrate complex of a polyaminoversenic acid was added as a 0.5 percent and 1.0 percent solution. A nitrogen purge was then maintained over the bleaching flask for a period of two minutes prior to adding a specified volume of 1 percent sodium hydrosulfite, while stirring for 30 seconds. The deaerated bleaching flask was placed in a constant temperature bath set at the desired bleaching temperature.

At the conclusion of the bleaching period, the pH factor was adjusted to 4.5 and a handsheet was formed. The handsheet was then oven-dried and the results of the mixture treated with the sodium salts and complexes thereof were compared with the untreated mixtures.

mately 20 lbs. of sodium hydrosulfite per ton of pulp (O.D.), as described in Example I. Again, the pulp consistency was maintained at 3.25 percent. A disilicate complex of the sodium salt of glucono-citrate complex of polyaminoversenic acid was added to the groundwood pulp in mixture solution. The bleaching process was conducted in the presence of this sequestering agent. The effects of the presence of this sequestering agent in bleaching using sodium hydrosulfite in various concentrations and adding ferric ion in varying concentrations are given below:

TABLE II

Groundwood Pulp Bleaching With Sodium Hydrosulfite
In The Presence Of The Sodium Salt Of The Glucono-Citrate Complex Of Polyaminoversenic Acid
At 140°F. For One Hour

| Bleach No. | Sodium Hydrosulfite Added Per Ton Of Pulp (lbs.) | Sodium Salt Of The Glucono-Citrate Complex Of Polyaminoversenic Acid Added Per Ton Of Pulp (lbs.) | Ferric Ion Added On Pulp Basis (ppm) | Brightness Gain | Points Above Untreated Pulp |
|---|---|---|---|---|---|
| 787–188 | 20.5 | None | 1500 | 11.2 | — |
|  | 20.5 | 5.0 | 1500 | 12.6 | 1.4 |
| 787–192 | 21.0 | None | 100 | 5.9 | — |
|  | 21.0 | 0.1 | 100 | 6.2 | 0.3 |
|  | 21.0 | 0.2 | 100 | 6.6 | 0.7 |
|  | 21.0 | 0.5 | 100 | 7.3 | 1.4 |
|  | 21.0 | 1.0 | 100 | 7.5 | 1.6 |

EXAMPLE I

A sample of Great Northern Groundwood Pulp was bleached at 140°F. for 60 minutes with approximately 20 lbs. of sodium hydrosulfite per ton of pulp (O.D.). The pulp consistency was maintained, as described above, at 3.25 percent. The effects of the sodium salt of glucono-citrate complex of polyaminoversenic acid were determined for various sodium hydrosulfite bleaching concentrations and ferric ion concentrations. In practically every instance, (TABLE I or II), it is not critical that the sequestering agent salt be added separately or simultaneously or as an additive in the sodium hydrosulfite solution. The results of these tests are given below in TABLE I:

As can be seen from TABLE I, the sodium salt produced a brightness increase of 0.4 to 1.5 when bleaching in the presence of 1,500 ppm ferric ions. At the 100 ppm ferric ion level, the increased brightness factor spread, as might be expected, was found to be somewhat higher in the range of 0.8 to 1.5.

The results tabulated in TABLE II above, show an increased brightness factor over untreated groundwood pulp of 1.4 when the disilicate complex of the sodium salt of the glucono-citrate complex of the polyaminoversenic acid is used in the presence of 1,500 ppm ferric ions at the 5 lbs. per ton level. The brightness improvement factor was in the range of 0.3 to 1.6 at lower usage levels having 100 ppm ferric ions added therein.

Thus, it can be seen that these biodegradable sequestering agents can satisfactorily be substituted for the

TABLE I

Groundwood Pulp Bleaching With Sodium Hydrosulfite
In The Presence Of The Sodium Salt Of The Glucono-Citrate Complex Of Polyaminoversenic Acid
At 140°F. For One Hour

| Bleach No. | Sodium Hydrosulfite Added Per Ton Of Pulp (lbs.) | Sodium Salt Of The Glucono-Citrate Complex Of Polyaminoversenic Acid Added Per Ton Of Pulp (lbs.) | Ferric Ion Added On Pulp Basis (ppm) | Brightness Gain (%Mg) | Points Above Untreated Pulp |
|---|---|---|---|---|---|
| 787–186 | 20.8 | None | 1500 | 10.3 | — |
|  | 20.8 | 5.0 | 1500 | 10.9 | 0.6 |
|  | 20.8 | 10.0 | 1500 | 11.4 | 1.1 |
| 787–190 | 21.4 | None | 1500 | 6.3 | — |
|  | 21.4 | 1.0 | 1500 | 7.0 | 0.7 |
|  | 21.4 | 3.0 | 1500 | 6.7 | 0.4 |
|  | 21.4 | 5.0 | 1500 | 7.2 | 0.9 |
|  | 21.4 | 10.0 | 1500 | 7.8 | 1.5 |
| 787–194 | 20.8 | None | 100 | 7.0 | — |
|  | 20.8 | 0.5 | 100 | 7.8 | 0.8 |
|  | 20.8 | 1.0 | 100 | 7.9 | 0.9 |
|  | 20.8 | 2.5 | 100 | 8.5 | 1.5 |
|  | 20.8 | 5.0 | 100 | 8.3 | 1.3 |

EXAMPLE II

A sample of Great Northern Groundwood Pulp was bleached at 140°F. for sixty minutes with approxiphosphorus and nitrogen containing compounds previously used. The sequestering agents taught in this invention offer no phosphorus nutrient value for algae and other growths which aid in the eutrophication process.

We claim:

1. A method of bleaching groundwood pulp in mixture comprising the steps of:
    A. preparing a groundwood pulp water slurry of a consistency which is less than 5 percent and agitating said slurry;
    B. bleaching the groundwood pulp water slurry by adding thereto a bleach water solution, comprising a 0.2 to 15 percent solution of sodium hydrosulfite in the presence of a small but effective amount of a sequestering agent consisting of 0.5 to 1 percent solution of sodium salts of glucono-citrate complex of polyaminoversenic acid;
    C. maintaining the temperature of the slurry at 90° to 170°F. and the pH thereof at 4.1 to 6.3.

2. The method according to claim 1, wherein said sequestering agent consists of a disilicate complex of sodium salts of glucono-citrate complex of polyaminoversenic acid.

3. The method according to claim 1, wherein the respective parts by weight of additives in the bleach water solution, per ton of pulp, are: 3.0 to 50.0 lbs. hydrosulfite to 0.5 – 10 lbs. of the sodium salts.

4. The method according to claim 2, wherein the respective parts by weight of additives in the bleach water solution, per ton of pulp, are: 3.0 to 50.0 lbs. hydrosulfite to 0.1 to 5.0 lbs. of the disilicate complex of sodium salts.

* * * * *